US 6,693,881 B1

(12) United States Patent
Huysmans et al.

(10) Patent No.: US 6,693,881 B1
(45) Date of Patent: Feb. 17, 2004

(54) METHOD FOR BIT ERROR RATE MEASUREMENTS IN A CELL-BASED TELECOMMUNICATION SYSTEM

(75) Inventors: Marc Huysmans, Berchem (BE); Frank Cyriel Michel Defoort, Kruibeke-Bazel (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/315,014

(22) Filed: May 20, 1999

(30) Foreign Application Priority Data

May 29, 1998 (EP) .............................. 98401303

(51) Int. Cl.⁷ ................................. H04J 3/14
(52) U.S. Cl. ................. 370/236.1; 370/236.2; 714/738
(58) Field of Search ................. 370/229, 230, 370/232, 233, 234, 252, 253, 236.1, 236.2, 395.1, 336, 359, 465, 394, 235; 714/704, 738, 750, 766

(56) References Cited

U.S. PATENT DOCUMENTS

| | | | | |
|---|---|---|---|---|
| 5,257,311 A | * | 10/1993 | Naito et al. ................. | 370/244 |
| 5,359,600 A | | 10/1994 | Ueda et al. | |
| 5,623,497 A | * | 4/1997 | Shimawaki et al. ........ | 714/704 |
| 5,726,991 A | * | 3/1998 | Chen et al. ................. | 714/704 |
| 5,761,216 A | * | 6/1998 | Sotome et al. .............. | 714/738 |
| 5,809,023 A | * | 9/1998 | Petersen et al. ............ | 370/336 |
| 5,920,558 A | * | 7/1999 | Saito et al. ................. | 370/359 |
| 6,301,226 B1 | * | 10/2001 | Lincoln ....................... | 370/229 |

FOREIGN PATENT DOCUMENTS

| | | |
|---|---|---|
| EP | 0 486 915 B1 | 5/1992 |
| EP | 0 730 359 A2 | 9/1996 |

OTHER PUBLICATIONS

Bernd Kernbaum: "Fehlermessung in digitalen Übertragungskanälen– Ein modulares System zur Fehlerstrukturaufzeichnung" Fernmelde–Ingenieur, Verlag Für Wissenschaft & Leben Georg Heidecker, vol. 51, No. 9, Sep. 1997, pp. 1–32, XP000198618.

Duff, J.A.: "Test Challenges of ATM" Annual Review of Communications, vol. 46, Jan. 1, 1993, pp. 320–328, XP000321941.

Telecommunication Standardization Sector of ITU: "ITU–T Recommendation I.610" International Telecommunication Union, Nov. 1995, XP002085435.

\* cited by examiner

*Primary Examiner*—Dang Ton
*Assistant Examiner*—Phuc Tran
(74) *Attorney, Agent, or Firm*—Sughrue Mion, PLLC

(57) ABSTRACT

A method for bit error rate measurements in a cell-based telecommunication system is presented, comprising the following steps of generating a first bit pattern at a first location of said telecommunication system, transmitting said first bit pattern from said first location to a second location of said telecommunication system, thereby obtaining a transmitted bit pattern, generating a second bit pattern at said second location, said second bit pattern being identical with the first bit pattern and comparing said transmitted bit pattern with said second bit pattern. The first bit pattern is transmitted in at least one unused cell (U, I), said unused cell (U, I) being generated during normal operation of said telecommunication system in the case of a lack of used cells to be transmitted.

11 Claims, 2 Drawing Sheets

METHOD FOR BIT ERROR RATE MEASUREMENTS IN A CELL-BASED TELECOMMUNICATION SYSTEM

BACKGROUND OF THE INVENTION

The present invention relates to a method for bit error rate measurements in a cell-based telecommunication system.

In cell-based telecommunication systems, the information is transferred by means of cells of fixed or variable byte-length. These cells typically have an overhead section wherein control, management and routing information is embedded and a payload section, carrying user information.

Cell-based telecommunication systems comprise for example ATM (Asynchronous Transfer Mode) communication networks. ATM cells for instance have a fixed length of 53 bytes, 8 bytes of which constitute the overhead section or the so called ATM cell header, reserved for overhead information.

The whole transmitted cell-stream in a cell-based network is generally composed of two different types of cells: on the one hand used cells carrying in their payload section the proper user information and on the other hand unused cells with no user information in their payload section. The unused cells are generated and inserted amid the used cells to be transmitted in order to provide a continuous cell-stream between transmitting means and receiving means.

Bit errors which occur during transmission of these cells, have a negative impact onto the quality of the connection. A bit error which occurs in the payload section of the cell implies a falsification of the transmitted information; wherein a bit error which occurs in the overhead section of the cell potentially implies a falsification of the destination address, and thus a loss of the cell.

Therefore in cell-based telecommunication systems, the bit error rates (ratio of bits transferred erroneously due to noise or impairments of the physical transmission medium in proportion to the totality of transferred bits) are traditionally measured during initialisation of the system or during a test phase. Hereby a predetermined signal is sent from a transmitter to a receiver. The arriving signal is then analysed at the receiver's side by comparing the transmitted signal with a generated reference signal.

In an ADSL (Asymmetric Digital Subscriber Line) system for instance, the signal to noise ratio (SNR) is measured at the different carrier frequencies during initialisation of the system. This signal to noise ratio can be seen as a measure for the expected bit error rate. The results of these measurements afterwards are used to determine the bit allocations, i.e. the way wherein data bits are distributed over the different carriers that constitute a DMT (Discrete Multi Tone) symbol, to cope with the maximum allowable bit error rate of $10^{-7}$ prescribed by the ADSL standard. The SNR measurements and the use thereof in the bit allocation process are described in the ANSI (American National Standards Institute) ADSL Standard T1E1.4, in paragraph 12 entitled 'Initialization' on pages 87–111 and in paragraph 6.5 entitled 'Tone Ordering' on Pages 36–37.

Traditional bit error rate measurement methods have the disadvantage, that normal operation of the system has to be interrupted and the system has to be brought in a test phase. During this test phase, no transmission of proper user information is possible.

SUMMARY OF THE INVENTION

The object of the present invention is to provide a method for bit error rate measurements in a cell-based telecommunication system during normal operation of the system.

According to the invention, this problem is solved by a method for bit error rate measurements in a cell-based telecommunication system in accordance to claim 1.

The method for bit error rate measurements in a cell-based telecommunication system, comprises the steps of generating a first bit pattern at a first location of the telecommunication system, transmitting the first bit pattern from the first location to a second location of the telecommunication system, thereby obtaining a transmitted bit pattern, generating a second bit pattern at the second location, the second bit pattern being identical with the first bit pattern and comparing the transmitted bit pattern with the second bit pattern. According to the invention the first bit pattern is transmitted in at least one unused cell, the unused cell being generated during normal operation of the telecommunication system in the case of lack of used cells, carrying user information, to be transmitted. The number of discrepancies counted during the comparison serves as a measure for the bit error rate.

It has to be noted, that in this context, the expression "unused cell" means cells, which do not carry user data in their payload section. In other words "unused cell" can either designate an idle cell or an unassigned ATM cell.

One essential advantage of the invention, compared with conventional methods is that the bit error rate measurements are performed during normal operation of the telecommunication system. Accordingly the telecommunication system has not to be interrupted and brought in a test phase in which no transmission of proper user information is possible.

In a cell-based telecommunication system, e.g. an ATM-network, where unused cells, carrying no user information, are generally inserted amid the used cells in order to provide a continuous cell-stream between transmitting means and receiving means, bit error rate measurements according to the present method advantageously need no additional bandwidth by using those unused cells.

It has to be noted, that the generated bit patterns are independent from any transmitted user information and that the bit pattern generated at the first location and the reference bit pattern generated at the second location are identical. This means, that the number of detected discrepancies between the transmitted bit pattern and the second bit pattern really represents a measure for the bit error rate at the moment of transmission, because the bit errors only can occur in the test bit pattern itself. This is not the case in systems, where control information, calculated on the basis of user data to be transmitted, is transmitted together with said user information and the transmitted control information is compared to control information calculated on the basis of the transmitted user data. In fact, in these systems, bit errors can occur as well in the transmitted user data as in the transmitted control information, thus leading to a possible falsification of the measurements results.

In a preferred embodiment, the steps for bit error rate measurements according to the present method are repeated at each generation of an unused cell. The accuracy of the achieved bit error rates is increasing with the number of repetitions, i.e. with the number of comparisons between transmitted bit patterns and generated bit patterns at the receiver.

The comparison between the transmitted bit pattern and the second bit pattern is preferably bit synchronised, which enables a fast evaluation of bit error rates during measurements.

The generation of the second bit pattern may be synchronised with the arrival of the transmitted bit pattern at a comparator means for comparing said transmitted bit pattern with said second bit pattern.

The first bit pattern is advantageously a predetermined bit sequence or an algorithm-based counter bit-sequence. Both types of bit patterns may be easily reproduced at the receiving means.

The present invention also relates to a device for bit error rate measurement in a cell-based telecommunication system. A device according to the invention comprises a transmitter, a receiver, a first bit pattern generator for generating a first bit pattern to be transmitted from the transmitter to the receiver in order to obtain a transmitted bit pattern, a second bit pattern generator for generating a second bit pattern at the receiving means, the second bit pattern being identical to the first bit pattern, a comparator for comparing the transmitted bit pattern with the second bit pattern and means for inserting the first bit pattern in at least one unused cell, said unused cell being generated during normal operation of said telecommunication system in the case of lack of used cells to be transmitted.

In a preferred embodiment, the device for bit error rate measurements comprises a synchroniser for activating the second bit pattern generator at each arrival of an unused cell at said comparator.

In the case of a bi-directional communication system, each subscriber station is simultaneously sending and receiving cells, thus provided with transceivers, each transceiver comprising transmitting means and receiving means.

BRIEF DESCRIPTION OF THE DRAWINGS

The present invention will be more apparent from the following description of a not limiting embodiment with reference to the attached drawings, wherein.

DETAILED DESCRIPTION OF THE INVENTION

Figure 1:
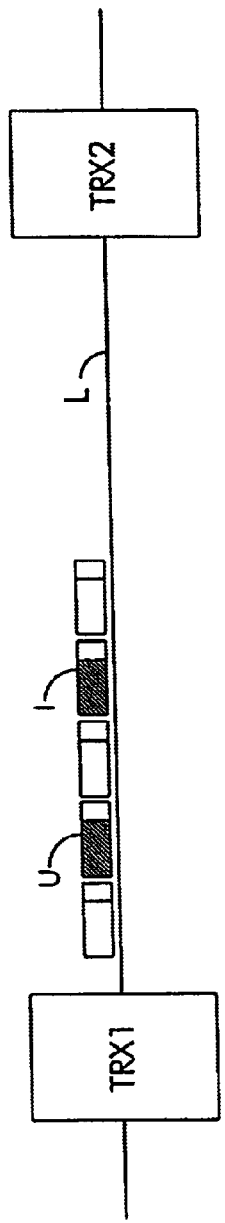
FIG. 1 shows a schematic view of a cell-transfer between a first transceiver and a second transceiver in a cell-based telecommunication network.

FIG. 1 shows a schematic communication link between a first transceiver TRX1 and a second transceiver TRX2 in a cell-based network, e.g. an ATM-Network.

Both transceivers TRX1 and TRX2 are interconnected via a physical transmission medium, for example an optical fibre cable, or via a wireless transmission path represented here by link L.

The information transferred between the first transceiver TRX1 and the second transceiver TRX2 is packed in cells of fixed or variable length. These cells typically have an overhead section wherein control, management and routing information is embedded, and a payload section, carrying user information.

Cell-based telecommunication systems comprise for example ATM (Asynchronous Transfer Mode) communication networks. ATM cells for instance have a fixed length of 53 bytes, 8 bytes of which constitute the overhead section or the so called ATM cell header, reserved for overhead information.

The cells are transmitted via link L either from the first transceiver TRX1 to the second transceiver TRX2. In the case of a bi-directional communication system, each transceiver TRX1 and TRX2 is simultaneously sending and receiving cells. Accordingly, each of the transceivers TRX1 and TRX2 comprises a transmitter for sending and a receiver for receiving cells.

The whole transmitted cell-stream in a cell-based network is generally composed of two different types of cells: on the one hand used cells carrying in their payload section the proper user information and on the other hand unused cells with no user data in their payload section. The unused cell can be either an idle cell I or an unassigned cell U.

Figure 2:
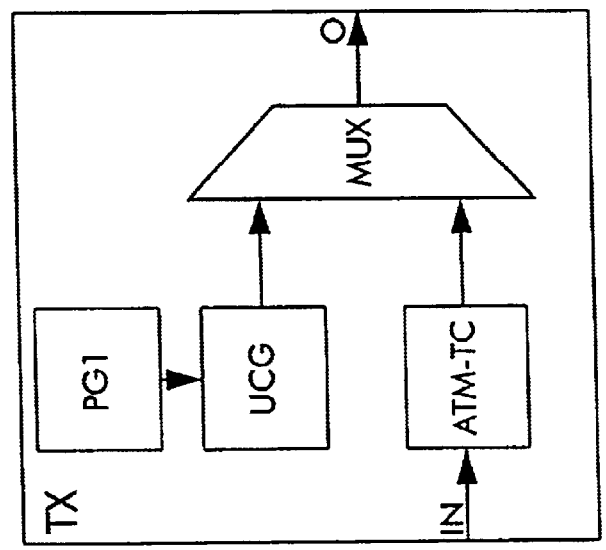
FIG. 2 shows a schematic view of a transmitter of a device for bit error measurements.

FIG. 2 shows a schematic view of a transmitter TX, component of transceiver TRX1 and transceiver TRX2 in an ATM-network. The transmitter TX comprises an ATM-transmitter circuitry ATM-TC for converting an arriving bit stream of user information at the input IN into used ATM-cells, an unused cell generator UCG for generating unused cells in the case of a lack of used ATM-cells to be transmitted and a multiplexer MUX for collecting the used ATM-cells and the unused cells to a common and continuous cell-stream at the output O. The multiplexer MUX may comprise a waiting queue (not shown) for storing cells, for example a FIFO-queue (First In First Out-queue).

A first bit pattern generator PG1 is present at the transmitter TX for generating a first reproducible bit pattern and for inserting said reproducible bit pattern into unused cells generated in said unused cell generator UCG. It has to be noted that the first bit pattern generator PG1 is advantageously integrated into the unused cell generator UCG.

Figure 3:
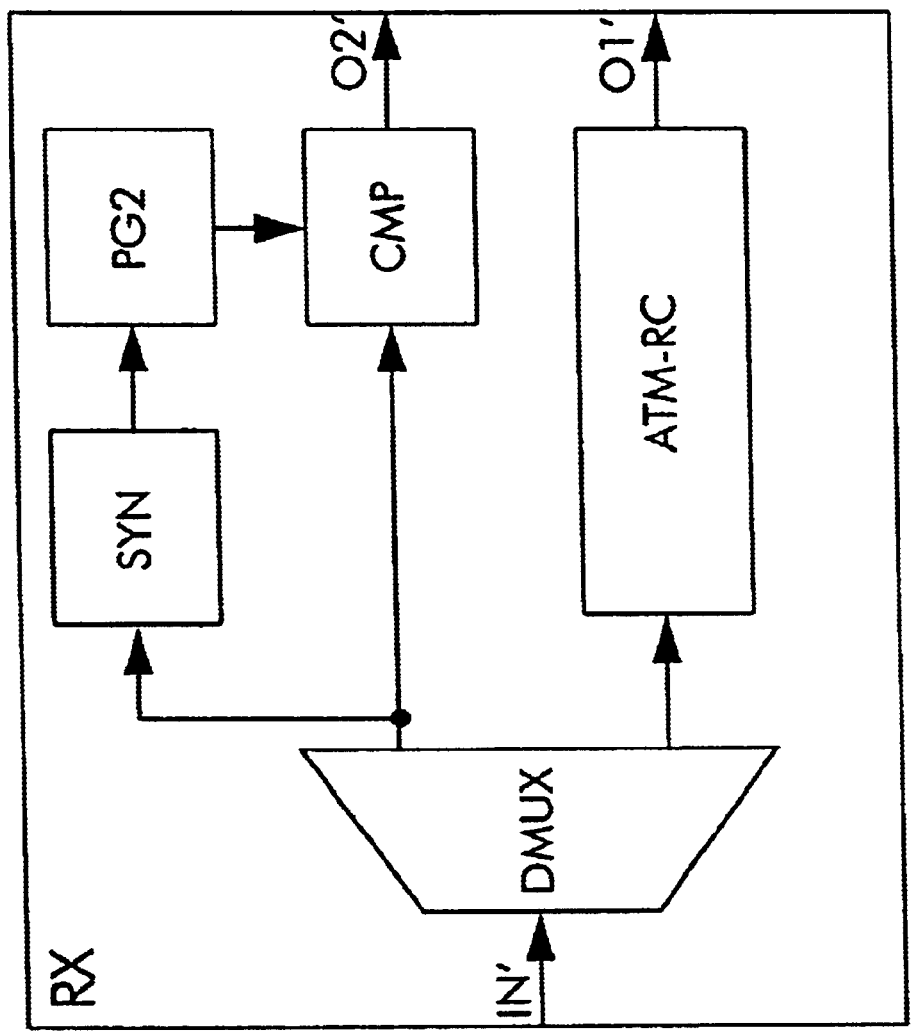
FIG. 3 shows a schematic view of a receiver of a device for bit error measurements.

FIG. 3 shows a schematic view of a receiver RX, component of transceiver TRX1 and transceiver TRX2 in an ATM-network. The receiver RX comprises a demultiplexer DMUX for splitting up the arriving cell-stream at the input IN' in used ATM-cells and unused cells. An ATM-receiving circuitry ATM-RC is connected to the demultiplexer DMUX for delineating the used cells in the received bit stream and for decoding the proper user information at the output O1. The receiver further comprises a synchroniser SYN for activating a second bit pattern generator PG2 with each arrival of an unused cell I, U, whereby the second bit pattern generator PG2 is generating a copy of the reproducible bit pattern, and a comparator CMP for comparing the transmitted bit pattern with the bit pattern generated the second bit pattern generator PG2 at the output O2'.

During the transmission of user information in an ATM-network from the first transceiver TRX1 to the second transceiver TRX2, the user information to be transmitted, which is present in a bit stream form at the input IN, is converted by the ATM-transmitter circuitry ATM-TC into ATM-cells. Thereby the user bits are embedded in the payload section of the ATM-cells, forming the so called used cells. The overhead section or header of each used ATM-cell carries a destination address—in this case the address of the transceiver TRX2—and routing information.

On transmit, the used cells are mapped by the multiplexer MUX into a Time Division Multiplexing (TDM) frame format. Generally ATM-networks are used for the simultaneous transmission of multiple cell streams belonging to several services, for example video, moved pictures, sound, and data, whereby the multiple cell streams are multiplexed together in the multiplexer MUX. In the example represented in the figures however, the transmitter TX only transmits one single cell stream (only one ATM-transmission circuitry ATM-TC).

During the multiplexing process, if an ATM-slot is not immediately available, the arriving used ATM-cell at the input of the multiplexer MUX is stored in the waiting queue (not shown) of the multiplexer MUX. Otherwise, if there is no used ATM-cell to transmit and if the queue of the multiplexer MUX is empty when the time arrives to fill the next synchronous cell time slot, then an unused cell U, I, generated by the unused cell generator UCG, is inserted instead of a used ATM-cell. In other words, those unused cells U, I are generally inserted amid the used ATM-cells so as to provide a continuous cell-stream between a first and a second transceiver, TRX1 and TRX2. By sending unused cells U, I, an ATM-network performs cell rate decoupling when it is not provided with used cells. This function allows an ATM-network to operate with a wide range of different speed physical interfaces, i.e. to operate with a wide range of different services.

According to the present invention, these unused cells I, U are used for bit rate measurements during normal operation of the system, i.e. during transmission of used ATM-cells for instance from a transmitter TX of the first transceiver TRX1 to a receiver RX of the second transceiver TRX2.

A first bit pattern generator PG1 generates a first reproducible bit pattern and inserts said first bit pattern into the payload section of an unused cell U, I generated by the unused cell generator UCG of the transmitter TX. In the case of lack of used ATM-cells at the multiplexer MUX, the unused cell U, I carrying the bit pattern is inserted by the multiplexer MUX amid used ATM-cells in the cell-stream.

Both types of cells, the used ATM-cells (carrying user information) generated by the ATM-transmission circuitry and the unused ATM-cells U, I (carrying reproducible bit patterns) generated by the unused cell generator UCG, are collected to a common and continuous cell-stream at the output O of the multiplexer MUX and sent via link L (FIG. 1) to the receiver RX (FIG. 3) of the second transceiver TRX2 (FIG. 1).

On the reception at the input IN' of the demultiplexer DMUX, the arriving cell-stream is split up by the demultiplexer DMUX on the one hand into the used ATM-cells and on the other hand into the unused ATM-cells I, U (FIG. 3). Both types of cells are distinguished by means of their overhead section, carrying a different identification pattern.

The used ATM-cells are relayed to the ATM-receiving circuitry ATM-RC, where the individual cells are delineated in the received bit stream and decoded in the proper user information.

On arrival of a cell, identified as an unused cell U, I, the second bit pattern generator PG2 of the receiver RX is activated. To make the system work properly, the operation of the second bit pattern generator PG2 and the comparator CMP in the receiver RX of the second transceiver TRX2 needs to be synchronised. This is the task of the synchroniser SYN, which activates the second pattern generator PG2 with each new arrival of an unused cell U, I, i.e. with the arrival of the transmitted predetermined bit pattern at the comparator CMP.

The second bit pattern generator PG2 generates bit-by-bit a bit pattern, identical to the reproducible bit pattern inserted in the payload section of that cell U, I by the unused cell generator UCG of the transceiver TX. Simultaneously the comparator CMP compares bit-by-bit the transmitted bit pattern carried in the payload section of the arrived cell U, I with the reproduced bit pattern generated by the second bit pattern generator PG2.

The number of discrepancies counted during comparison between the transmitted bit patterns and the copied bit patterns serve as a measure for the bit error rate.

In this way, statistical bit error rate measurements are performed during normal operation of the telecommunication system, which has not to be interrupted and brought in a test phase.

The bit error rate measurements according to the present invention occupy no additional bandwidth on the link L between the transceivers TRX1, TRX2 and the required additional equipment in the transceivers TRX1, TRX2 is simple. The unused cell generator UCG of the transmitter TX just needs to be able to embed in a payload section of an unused cell U, I a reproducible pattern, that will be transmitted and then used for statistical bit error rate measurements.

What is claimed is:

1. A method for bit error rate measurements in a cell-based telecommunication system, comprising:
    a) generating a first bit pattern at a first location of said telecommunication system,
    b) transmitting the first bit pattern from said first location to a second location of said telecommunication system, thereby obtaining a transmitted bit pattern,
    c) generating a second bit pattern at said second location, said second bit pattern being identical with the first bit pattern, and
    d) comparing said transmitted bit pattern with said second bit pattern,
wherein said first bit pattern is transmitted in at least one unused cell, said unused cell being generated, without the need to enter a dedicated test mode, during normal operation of said telecommunication system in the case of lack of used cells to be transmitted.

2. The method according to claim 1, wherein the steps of a)–d) are repeated at each generation of an unused cell.

3. The method for bit error rate measurements according to claim 1, wherein the comparison between said transmitted bit pattern and said second bit pattern is bit synchronized.

4. The method for bit error rate measurements according to claim 1, wherein the generation of the second bit pattern is synchronized with the arrival of the transmitted bit pattern at a comparator means for comparing said transmitted bit pattern with said second bit pattern.

5. The method for bit error rate measurements according to claim 1, wherein said first bit pattern is a predetermined bit pattern or an algorithm-based counter bit-sequence.

6. A device for bit error rate measurements in a cell-based telecommunication system, comprising:
    transmitting means,
    receiving means,
    a first bit pattern generator for generating a first bit pattern to be transmitted from said transmitting means to said receiving means, thereby obtaining a transmitted bit pattern,
    a second bit pattern generator for generating a second bit pattern at said receiving means, said second bit pattern being identical to said first bit pattern,
    a comparator means for comparing said transmitted bit pattern with said second bit pattern, and
    means for inserting said first bit pattern into at least one unused cell generated, without the need to enter a dedicated test mode, during normal operation of said telecommunication system in the case of lack of used cells to be transmitted.

7. The device for bit error rate measurements according to claim 6, further comprising a synchronizer for activating said second bit pattern generator at an arrival of an unused cell at said comparator means.

8. A device for bit error rate measurements in a cell-based telecommunication system, comprising:

transmitting means;

receiving means;

a first bit pattern generator for generating a first bit pattern to be transmitted from said transmitting means to said receiving means, thereby obtaining a transmitted bit pattern;

a second bit pattern generator for generating a second bit pattern at said receiving means, said second bit pattern being identical to said first bit pattern;

an unused cell generator for generating unused cells;

a comparator means for comparing said transmitted bit pattern with said second bit pattern; and means for inserting said first bit pattern into at least one said unused cell, which is being generated, without the need to enter a dedicated test mode, during normal operation of said telecommunication system in the case of lack of used cells to be transmitted;

wherein said first bit pattern is integrated into said unused cell generator.

9. The device for bit error rate measurements in a cell-based telecommunication system as set forth in claim 8, further comprising a synchronizer for activating said second bit pattern generator.

10. The device for bit error rate measurements in a cell-based telecommunication system as set forth in claim 8, wherein said transmitted bit pattern is synchronized with said second bit pattern at said comparator means.

11. The device for bit error rate measurements in a cell-based telecommunication system as set forth in claim 8, wherein cells generated by said unused cell generator are combined with used cells at an output of a multiplexer.

* * * * *